United States Patent
Li et al.

(10) Patent No.: US 9,026,726 B2
(45) Date of Patent: *May 5, 2015

(54) DATA READ/WRITE SYSTEM

(75) Inventors: Haiyang Li, Shanghai (CN); Qingjiang Ma, Shanghai (CN)

(73) Assignee: Montage Technology (Shanghai) Co., Ltd., Shanghai (CN)

( * ) Notice: Subject to any disclaimer, the term of this patent is extended or adjusted under 35 U.S.C. 154(b) by 151 days.

This patent is subject to a terminal disclaimer.

(21) Appl. No.: 13/813,355

(22) PCT Filed: Aug. 9, 2011

(86) PCT No.: PCT/CN2011/078138
§ 371 (c)(1),
(2), (4) Date: Jan. 30, 2013

(87) PCT Pub. No.: WO2013/007048
PCT Pub. Date: Jan. 17, 2013

(65) Prior Publication Data
US 2013/0132660 A1    May 23, 2013

(30) Foreign Application Priority Data
Jul. 11, 2011   (CN) .......................... 2011 1 0193328

(51) Int. Cl.
*G06F 12/00*   (2006.01)
*G06F 12/02*   (2006.01)
*G06F 11/10*   (2006.01)

(52) U.S. Cl.
CPC ............ *G06F 12/00* (2013.01); *G06F 12/0246* (2013.01); *G06F 11/1004* (2013.01)

(58) Field of Classification Search
None
See application file for complete search history.

(56) References Cited

U.S. PATENT DOCUMENTS

| | | | |
|---|---|---|---|
| 2010/0064200 A1* | 3/2010 | Choi et al. | 714/773 |
| 2011/0035644 A1* | 2/2011 | Madan | 714/758 |
| 2011/0239080 A1* | 9/2011 | Sakaue et al. | 714/752 |
| 2013/0046941 A1* | 2/2013 | Ma et al. | 711/155 |

FOREIGN PATENT DOCUMENTS

| | | |
|---|---|---|
| CN | 100468367 C | 3/2009 |
| CN | 101667454 A | 3/2010 |

OTHER PUBLICATIONS

Mar. 29, 2012 International Search Report issued in International Application No. PCT/CN2011/078138.

* cited by examiner

*Primary Examiner* — Christian P Chace
*Assistant Examiner* — Tracy A Warren
(74) *Attorney, Agent, or Firm* — Oliff PLC (57) ABSTRACT

The present invention provides a data read/write system. The data read/write system includes a memory controller and a memory module. The memory controller includes a first control circuit, a data output circuit, and a data receiving circuit. The memory module includes a memory buffer and at least two memory chips. The memory buffer includes a second control circuit, a write circuit, and a read circuit. The advantage of the present invention is that, when data is read or written into the memory chip, especially a DDR4 X4 memory chip, low power consumption of interface data transmission can be achieved through a data bus inversion control line DBI.

18 Claims, 3 Drawing Sheets

DATA READ/WRITE SYSTEM

BACKGROUND OF THE PRESENT INVENTION

1. Field of Invention

The present invention relates to the field of computers, and specifically to a data read/write system.

2. Description of Related Arts

The DDR4 SDRAM is the next generation synchronous dynamic random access memory technology. In contrast to the prior SDRAM technology, the DDR4 is revolutionarily changed. In the new generation DDR4 SDRAM, the Through Silicon Via (TSV) technology and a multi-layer manufacturing process (4 stacks or 8 stacks) may be used, thereby greatly increasing the capacity of a memory chip. The DDR4 works in a frequency range from 1600 MHz to 3200 MHz, which may also be expanded to a frequency range from 2133 MHz to 4266 MHz, and a working voltage of the DDR4 is even reduced to a voltage range from 1.05 V to 1.25 V. Moreover, in the DDR4, the number of banks is increased, and an input/output interface circuit is improved. In contrast to the DDR3 SDRAM, the DDR4 has many advantages such as large memory capacity, a high working frequency, a low working voltage, and small power consumption.

Since the working frequency of the DDR4 memory chip is high, an error rate of a data read/write operation is greatly increased. Therefore, how to read data from a DDR4 X4 memory chip or write data into the DDR4 X4 memory chip becomes a problem to be solved by those skilled in the art.

SUMMARY OF THE PRESENT INVENTION

An objective of the present invention is to provide a data read/write system.

In order to achieve the foregoing objective and other objectives, a data output circuit provided in the present invention comprises:

a first check data generation unit, configured to generate a first set of check data according to $n1*b$ pieces of data in $n*b$ pieces of data to be output, and generate a second set of check data according to the remaining $n2*b$ pieces of data in the $n*b$ pieces of data to be output;

a first data processing unit, connected to an output end of the first check data generation unit, and configured to: determine first inversion control data corresponding to n pieces of data according to every n pieces of data in the $n*b$ pieces of data to be output; determine first inversion control data corresponding to every n pieces of data in data formed by the first set of check data and the second set of check data from the first check data generation unit to be of a second numerical value; when the determined first inversion control data is of a first numerical value, negate n pieces of data to be output corresponding to the first inversion control data and then output the n pieces of negated data; otherwise, directly output the n pieces of data to be output; and output the first inversion control data corresponding to every n pieces of data; and a first data output unit, connected to an output end of the first data processing unit, disposed with a first data bus and a first data bus inversion control line, and configured to output the $n*b$ pieces of data, the first set of check data, the second set of check data, and the first inversion control data from the first data processing unit, wherein the n pieces of data are output through the first data bus each time, and meanwhile, the first inversion control data corresponding to the n pieces of data is output through the first data bus inversion control line.

A write circuit for writing data into a memory chip provided in the present invention comprises:

a first data collection unit, disposed with a second data bus and a second data bus inversion control line, and configured to collect n pieces of data through the second data bus each time to accumulatively collect $n*b$ pieces of data, a first set of check data, and a second set of check data, and collect second inversion control data corresponding to every n pieces of data through the second data bus inversion control line;

a first data restoration unit, connected to an output end of the data collection unit, and configured to, when the second inversion control data from the data collection unit is of a first numerical value, negate n pieces of data corresponding to the inversion control data and output the n pieces of negated data; otherwise, directly output the n pieces of data; and a write unit, connected to an output end of the data restoration unit, and configured to write $n1*b$ pieces of data in the $n*b$ pieces of data and the first set of check data from the data restoration unit into one memory chip through a third data bus, and write $n2*b$ pieces of data in the $n*b$ pieces of data and the second set of check data from the data restoration unit into the other memory chip through the third data bus.

A read circuit for reading data from a memory chip provided in the present invention comprises:

a data read unit, disposed with a fourth data bus connected to two memory chips, and configured to read $n1*b$ pieces of data and a third set of check data from one memory chip and read $n2*b$ pieces of data and a fourth set of check data from the other memory chip through the fourth data bus;

a second data processing unit, connected to an output end of the data read unit, and configured to: determine third inversion control data corresponding to every n pieces of data in $n*b$ pieces of data from the data read unit; determine third inversion control data corresponding to every n pieces of data in data formed by the third set of check data and the fourth set of check data to be of a second numerical value; when the determined third inversion control data is of a first numerical value, negate n pieces of data corresponding to the third inversion control data and then output the n pieces of negated data; otherwise, directly output the n pieces of data; and output the third inversion control data corresponding to the every n pieces of data, wherein $n=n1+n2$; and a second data output unit, connected to an output end of the second data processing unit, and configured to output n pieces of data from the second data processing unit through a fifth data bus each time to accumulatively output the $n*b$ pieces of data, the third set of check data, and the fourth set of check data, wherein each time the n pieces of data are output, third inversion control data corresponding to the n pieces of data is output through the third data bus inversion control line.

A data receiving circuit provided in the present invention comprises:

a second data collection unit, disposed with a sixth data bus and a fourth data bus inversion control line, and configured to collect n pieces of data through the sixth data bus each time to accumulatively collect $n*b$ pieces of data, a third set of check data, and a fourth set of check data, and collect fourth inversion control data corresponding to every n pieces of data through the fourth data bus inversion control line;

a second data restoration unit, connected to an output end of the second data collection unit, and configured to, when the fourth inversion control data is of the first numerical value, negate n pieces of data corresponding to the fourth inversion control data and output the n pieces of negated data; otherwise, directly output the n pieces of data; and a check unit, connected to an output end of the second data restoration unit, and configured to check whether $n1*b$ pieces of data in the $n*b$ pieces of data from the second data restoration unit is faulty according to the third set of check data from the second data restoration unit, and check whether n2*b pieces of data in the n*b pieces of data from the second data restoration unit is faulty according to the fourth set of check data from the second data restoration unit, so as to check whether the n*b pieces of data from the second data restoration unit is faulty.

A memory controller provided in the present invention comprises: the data output circuit and the data receiving circuit, wherein the first data bus of the data output circuit is connected to the sixth data bus of the data receiving circuit, and the first data bus inversion control line of the data output circuit is connected to the fourth data bus inversion control line of the data receiving circuit; and a first control circuit, disposed with a first control signal bus and configured to output a control signal comprising a read/write control instruction and control the data output circuit and the data receiving circuit.

A memory buffer provided in the present invention comprises: the write circuit and the read circuit, wherein the second data bus comprised in the write circuit is connected to the fifth data bus comprised in the read circuit, the third data bus comprised in the write circuit is connected to the fourth data bus comprised in the read circuit, and the second data bus inversion control line comprised in the write circuit is connected to the third data bus inversion control line comprised in the read circuit; and a second control circuit, disposed with a second control signal bus and configured to control read and write operations of the write circuit and the read circuit according to a received control signal.

A memory module provided in the present invention comprises the memory buffer and at least two memory chips, wherein the third data bus comprised in the memory buffer is connected to each of the memory chips.

A data read/write system provided in the present invention comprises the memory controller and the memory module, wherein the second data bus of the memory module is connected to the first data bus of the memory controller, the second data bus inversion control line of the memory module is connected to the first data bus inversion control line of the memory controller, and the second control signal bus of the memory module is connected to the first control signal bus of the memory controller.

In sum, through the data read/write system consistent with the present invention, when data is read or written into the memory chip, especially into a DDR4 X4 memory chip, low power consumption of interface data transmission can be achieved through a data bus inversion control line DBI.

DETAILED DESCRIPTION OF THE PREFERRED EMBODIMENTS

Figure 1:
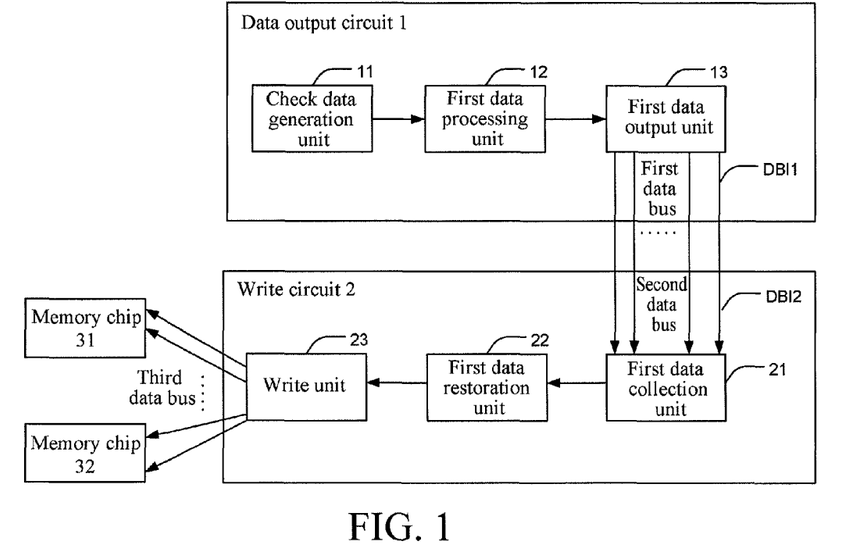
FIG. 1 is a schematic diagram of a data read/write system for writing data into a memory chip according to a preferred embodiment of the present invention.

FIG. 1 is a schematic diagram of a data read/write system for writing data into a memory chip according to a preferred embodiment of the present invention. The data read/write system includes a data output circuit 1 and a write circuit 2. The data output circuit 1 includes a check data generation unit 11, a first data processing unit 12, and a first data output unit 13. The write circuit 2 includes a first data collection unit 21, a first data restoration unit 22 and a write unit 23.

The check data generation unit 11 is configured to generate a first set of check data according to n1*b pieces of data in n*b pieces of data to be output and generate a second set of check data according to the remaining n2*b pieces of data in the n*b pieces of data to be output.

A circuit structure of the check data generation unit 11 is determined according to a pre-determined method adopted to generate the first set of check data and the second set of check data. For example, if it is per-determined to adopt a cyclic redundancy check method to generate the two sets of check data, preferably, the check data generation unit 11 includes two sets of generation circuits for generating cyclic redundancy check data.

For example, the n*b=8*8 pieces of data to be output are described in Table 1.

TABLE 1

| D0  | D1  | D2  | D3  | D4  | D5  | D6  | D7  |
| D8  | D9  | D10 | D11 | D12 | D13 | D14 | D15 |
| D16 | D17 | D18 | D19 | D20 | D21 | D22 | D23 |
| D24 | D25 | D26 | D27 | D28 | D29 | D30 | D31 |
| D32 | D33 | D34 | D35 | D36 | D37 | D38 | D39 |
| D40 | D41 | D42 | D43 | D44 | D45 | D46 | D47 |
| D48 | D49 | D50 | D51 | D52 | D53 | D54 | D55 |
| D56 | D57 | D58 | D59 | D60 | D61 | D62 | D63 |

One set of generation circuits for generating the cyclic redundancy check data generate the first set of check data NewCRC[10], NewCRC[11], NewCRC[12], NewCRC[13], NewCRC[14], NewCRC[15], NewCRC[16], and NewCRC[17] according to the n1*b pieces of data, for example, data D0 to D31 in a first row to a fourth row, in Table 1. The other set of generation circuits for generating the cyclic redundancy check data generate the second set of check data NewCRC[20], NewCRC[21], NewCRC[22], NewCRC[23], NewCRC[24], NewCRC[25], NewCRC[26], and NewCRC[27] according to the remaining n2*b pieces of data, for example, data D32 to D63 in a fifth row to an eighth row, in the n*b pieces of data to be output.

Preferably, the generation circuits for generating the first set of check data according to data D0 to D31 described in Table 1 include a combinational logical circuit with a logical relationship shown in Equation 1, and the generation circuits for generating the second set of check data according to data D32 to D63 described in Table 1 include a combinational logical circuit with a logical relationship shown in Equation 2.

NewCRC[10]
=1^1^1^1^1^1^1^1^1^1^1^1^1^1^1^1^1^1^[D31]
^[D30]^[D28]^[D23]^[D21]^[D19]^[D18]^[D16]^
[D14]^[D12]^[D8]^[D7]^[D6]^[D0];

NewCRC[11]
=1^1^1^1^1^1^1^1^1^1^1^1^1^1^1^1^1^
[D30]^[D29]^[D28]^[D24]^[D23]^[D22]^[D21]^
[D20]^[D18]^[D17]^[D16]^[D15]^[D14]^[D13]^
[D12]^[D9]^[D6]^[D1]^[D0];

NewCRC[12]
=1^1^1^1^1^1^1^1^1^1^1^1^1^1^1^1^1^
[D29]^[D28]^[D25]^[D24]^[D22]^[D17]^[D15]^
[D13]^[D12]^[D10]^[D8]^[D6]^[D2]^[D1]^[D0];

NewCRC[13]=
1^1^1^1^1^1^1^1^1^1^1^1^1^1^1^1^[D30]^
[D29]^[D26]^[D25]^[D23]^[D18]^[D16]^[D14]^
[D13]^[D11]^[D9]^[D7]^[D3]^[D2]^[D1];

NewCRC[14]
=1^1^1^1^1^1^1^1^1^1^1^1^1^1^1^1^[D31]
^[D30]^[D27]^[D26]^[D24]^[D19]^[D17]^[D15]^
[D14]^[D12]^[D10]^[D8]^[D4]^[D3]^[D2];

NewCRC[15]
=1^1^1^1^1^1^1^1^1^1^1^1^1^1^1^1^[D31]
^[D28]^[D27]^[D25]^[D20]^[D18]^[D16]^[D15]^
[D13]^[D11]^[D9]^[D5]^[D4]^[D3];

NewCRC[16]
=1^1^1^1^1^1^1^1^1^1^1^1^1^1^1^1^[D29]
^[D28]^[D26]^[D21]^[D19]^[D17]^[D16]^[D14]^
[D12]^[D10]^[D6]^[D5]^[D4];

NewCRC[17]
=1^1^1^1^1^1^1^1^1^1^1^1^1^1^1^1^[D30]
^[D29]^[D27]^[D22]^[D20]^[D18]^[D17]^[D15]^
[D13]^[D11]^[D7]^[D6]^[D5];

NewCRC[20]
=1^1^1^1^1^1^1^1^1^1^1^1^1^1^1^1^[D63]
^[D62]^[D60]^[D55]^[D53]^[D51]^[D50]^[D48]^
[D46]^[D44]^[D40]^[D39]^[D38]^[D32];

NewCRC[21]
=1^1^1^1^1^1^1^1^1^1^1^1^1^1^1^1^
[D62]^[D61]^[D60]^[D56]^[D55]^[D54]^[D53]^
[D52]^[D50]^[D49]^[D48]^[D47]^[D46]^[D45]^
[D44]^[D41]^[D38]^[D33]^[D32];

NewCRC[22]
=1^1^1^1^1^1^1^1^1^1^1^1^1^1^1^1^
[D61]^[D60]^[D57]^[D56]^[D54]^[D49]^[D47]^
[D45]^[D44]^[D42]^[D40]^[D38]^[D34]^[D33]^
[D32];

NewCRC[23]
=1^1^1^1^1^1^1^1^1^1^1^1^1^1^1^1^[D62]
^[D61]^[D58]^[D57]^[D55]^[D50]^[D48]^[D46]^
[D45]^[D43]^[D41]^[D39]^[D35]^[D34]^[D33];

NewCRC[24]
=1^1^1^1^1^1^1^1^1^1^1^1^1^1^1^1^[D63]
^[D62]^[D59]^[D58]^[D56]^[D51]^[D49]^[D47]^
[D46]^[D44]^[D42]^[D40]^[D36]^[D35]^[D34];

NewCRC[25]
=1^1^1^1^1^1^1^1^1^1^1^1^1^1^1^1^[D63]
^[D60]^[D59]^[D57]^[D52]^[D50]^[D48]^[D47]^
[D45]^[D43]^[D41]^[D37]^[D36]^[D35];

NewCRC[26]
=1^1^1^1^1^1^1^1^1^1^1^1^1^1^1^1^[D61]
^[D60]^[D58]^[D53]^[D51]^[D49]^[D48]^[D46]^
[D44]^[D42]^[D38]^[D37]^[D36];

NewCRC[25]
=1^1^1^1^1^1^1^1^1^1^1^1^1^1^1^1^[D63]
^[D60]^[D59]^[D57]^[D52]^[D50]^[D48]^[D47]^
[D45]^[D43]^[D41]^[D37]^[D36]^[D35];

NewCRC[26]
=1^1^1^1^1^1^1^1^1^1^1^1^1^1^1^1^[D61]
^[D60]^[D58]^[D53]^[D51]^[D49]^[D48]^[D46]^
[D44]^[D42]^[D38]^[D37]^[D36];

Equation 1:

NewCRC[27]
=1^1^1^1^1^1^1^1^1^1^1^1^1^1^1^1^[D62]
^[D61]^[D59]^[D54]^[D52]^[D50]^[D49]^[D47]^
[D45]^[D43]^[D39]^[D38]^[D37];    Equation 2:

The first data processing unit 12 is connected to an output end of the check data generation unit 11, and configured to: determine first inversion control data corresponding to n pieces of data according to every n pieces of data in the n*b pieces of data to be output; determine first inversion control data corresponding to every n pieces of data in data formed by the first set of check data and the second set of check data from the check data generation unit to be of a second numerical value; when the determined first inversion control data is of a first numerical value, negate n pieces of data to be output corresponding to the first inversion control data and then output the n pieces of negated data; otherwise, directly output the n pieces of data to be output; and output the first inversion control data corresponding to every n pieces of data.

For example, the first numerical value is 0 and the second numerical value is 1. In the n*b pieces of data to be output, if more than half of the n pieces of data is 0, the first data processing unit 12 determines that the first inversion control data corresponding to the n pieces of data is of the first numerical value, that is, 0, and otherwise, determines that the first inversion control data corresponding to the n pieces of data is of the second numerical value, that is, 1.

Preferably, the first data processing unit 12 includes an accumulator, a comparison circuit, and n (for example, n=8) first combinational logical circuits with a logical relationship of $\overline{A1B1}+A1B1$. The accumulator is configured to accumulate n (n=8) pieces of data to be output, for example, data D0, D8, D16, D24, D32, D40, D48, and D56 in a first column in Table 1. The comparison circuit is connected to an output end of the accumulator, and configured to compare an output result of the accumulator with a binary number 100 (that is, n/2=8/2=4) and then output first inversion control data corresponding to the 8 pieces of data. In each of the n=8 first combinational logical circuits, A1 is received first inversion control data output by the comparison circuit, and B1 is one of n pieces of data corresponding to A1 (that is, the received first inversion control data). For example, B1 of the 1st first combinational logical circuit is received data D0 to be output, B1 of the 2nd first combinational logical circuit is received data D8 to be output, B1 of the 3rd first combinational logical circuit is received data D16 to be output, B1 of the 4th first combinational logical circuit is received data D24 to be output, B1 of the 5th first combinational logical circuit is received data D32 to be output, B1 of the 6th first combinational logical circuit is received data D40 to be output, B1 of the 7th first combinational logical circuit is received data D48 to be output, and B1 of the 8th first combinational logical circuit is received data D56 to be output. Therefore, when the first inversion control data is of the first numerical value, that is, A1=0, the n=8 first combinational logical circuits output $\overline{A1B1}+A1B1=\overline{B1}$, that is, respectively output inverse data $\overline{D0}, \overline{D8}, \overline{D16}, \overline{D24}, \overline{D32}, \overline{D40}, \overline{D48}$, and $\overline{D56}$ of the data to be output D0, D8, D16, D24, D32, D40, D48, and D56. If A1=1, the n=8 first combinational logical circuits output $\overline{A1B1}+A1B1=B1$, that is, respectively output the data to be output D0, D8, D16, D24, D32, D40, D48, and D56. Therefore, after b=8 operations, the first data processing unit 11 accumulatively output n*b=8*8 pieces of data and first inversion control data corresponding to every n=8 pieces of data. The first data processing unit 12 further determines that first inversion control data of the n=8 pieces of data formed by the first set of check data NewCRC[10], NewCRC[11], NewCRC[12], and NewCRC[13], and the second set of check data NewCRC[20], NewCRC[21], NewCRC[22], and NewCRC[23] from the check data generation unit 11 is of the second numerical value, and determines that first inversion control data of the n=8 pieces of data formed by the first set of check data NewCRC[14], NewCRC[15], NewCRC[16], and NewCRC[17], and the second set of check data NewCRC[24], NewCRC[25], NewCRC[26], and NewCRC[27] from the check data generation unit 11 is also of the second numerical value. Therefore, the n*b=8*8 pieces of data, the first set of check data, and the second set of check data accumulatively output by the first data processing unit 12 are described in Table 2, and second inversion control data corresponding to every n=8 pieces of data is described in Table 3, where the first second inversion control data to the tenth second inversion control data correspond to 8 pieces of data in a first column to a tenth column in Table 2 respectively.

TABLE 2

| d0 | d1 | d2 | d3 | d4 | d5 | D6 | d7 | NewCRC[10] | NewCRC[14] |
|----|----|----|----|----|----|----|----|------------|------------|
| d8 | d9 | d10 | d11 | d12 | d13 | D14 | d15 | NewCRC[11] | NewCRC[15] |
| d16 | d17 | d18 | d19 | d20 | d21 | d22 | d23 | NewCRC[12] | NewCRC[16] |
| d24 | d25 | d26 | d27 | d28 | d29 | d30 | d31 | NewCRC[13] | NewCRC[17] |
| d32 | d33 | d34 | d35 | d36 | d37 | d38 | d39 | NewCRC[20] | NewCRC[24] |
| d40 | d41 | d42 | d43 | d44 | d45 | d46 | d47 | NewCRC[21] | NewCRC[25] |
| d48 | d49 | d50 | d51 | d52 | d53 | d54 | d55 | NewCRC[22] | NewCRC[26] |
| d56 | d57 | d58 | d59 | d60 | d61 | d62 | d63 | NewCRC[23] | NewCRC[27] |

TABLE 3

| D64 | D65 | D66 | D67 | D68 | D69 | D70 | D71 | 1 | 1 |
|-----|-----|-----|-----|-----|-----|-----|-----|---|---|

Moreover, the first data processing unit 12 may also determine the first inversion control data corresponding to every n pieces of data in the n*b pieces of data and determine the first inversion control data corresponding to every n pieces of data in the data formed by the first set of check data and the second set of check data to be of the second numerical value at the same time, and then process, according to each piece of the first inversion control data, n pieces of data corresponding to the piece of the first inversion control data. Therefore, the first data processing unit 12 outputs the n pieces of data and the data formed by the first set of check data and the second set of check data in turn in b+2 clock edges (rising edges and falling edges).

The first data output unit 13 is connected to an output end of the first data processing unit 12, disposed with a first data bus and a first data bus inversion control line DBI1, and configured to output the n*b pieces of data, the first set of check data, the second set of check data, and the first inversion control data from the first data processing unit. Every time the n pieces of data are output through the first data bus, the first inversion control data corresponding to the n pieces of data is output through the first data bus inversion control line.

For example, the first data output unit 13 outputs the n*b=8*8 pieces of data, for example, data in the first column to the eighth column described in Table 2, and the first set of check data and the second set of check data, for example, data in the ninth column to the tenth column described in Table 2, through the first data bus, and meanwhile, each time one column of data is output, outputs first inversion control data corresponding to the column of data through the first data bus inversion control line DBI1.

Preferably, the first data output unit 13 includes a first data output sub-unit. The first data output sub-unit is connected to the output end of the first data processing unit 12, disposed with a first data bus and a first data bus inversion control line, configured to output a generated write data collection signal through the first data bus, and further configured to, whenever outputting the n pieces of data from the first data processing unit through the first data bus, output the first inversion control data corresponding to the n pieces of data through the first data bus inversion control line, and after outputting the n pieces of data from the first data processing unit at the $b^{th}$ time, output the first set of check data and the second set of check data from the check data generation unit.

For example, the first data output sub-unit outputs the generated write data collection signal through DQS1 in the first data bus, outputs n pieces of data, for example, data in the first column described in Table 2, through DQ1[7:0] in the first data bus at a first rising edge of the write data collection signal, and meanwhile, outputs first inversion control data, for example, a first piece of data D64 in Table 3, corresponding to the data in the first column through the first data bus inversion control line DBI1. Then, the first data output sub-unit outputs n pieces of data, for example, data in the second column described in Table 2, through the DQ1[7:0] in the first data bus at the first falling edge of the write data collection signal, and meanwhile, outputs first inversion control data, for example, a second piece of data D65 in Table 3, corresponding to the data in the second column through the first data bus inversion control line DBI1. Then, the first data output sub-unit outputs n pieces of data, for example, data in the third column described in Table 2, through the DQ1[7:0] in the first data bus at a second rising edge of the write data collection signal, and meanwhile, outputs first inversion control data, for example, a third piece of data D66 in Table 3, corresponding to the data in the third column through the first data bus inversion control line DBI1. After the first data output sub-unit outputs n pieces of data, for example, data in the eighth column described in Table 2, through the DQ1[7:0] in the first data bus at the fourth falling edge of the write data collection signal, and meanwhile, outputs first inversion control data, for example, the eighth piece of data D71 in Table 3, corresponding to the data in the eighth column through the first data bus inversion control line DBI1, the first data output sub-unit outputs the first set of check data and the second set of check data, for example, data in the ninth column described in Table 2, from the check data generation unit 12 through the DQ1[7:0] in the first data bus at the fifth rising edge of the write data collection signal at the b+1=8+1=9th time, and meanwhile, outputs first inversion control data, for example, the ninth piece of data 1 in Table 3, corresponding to the data in the ninth column through the first data bus inversion control line DBI1. Then, the first data output sub-unit outputs the first set of check data and the second set of check data, for example, data in the tenth column described in Table 2, from the check data generation unit 12 through the DQ1[7:0] in the first data bus at the fifth falling edge of the write data collection signal at the b+2=8+2=10th time, and meanwhile, outputs first inversion control data, for example, the tenth piece of data 1 in Table 3, corresponding to the data in the tenth column through the first data bus inversion control line DBI1.

It should be noted that, the method for the first data output unit to output the data is not limited to the method described as above. Moreover, the manner for the first data output unit 13 to generate the write data collection signal is understood by those skilled in the art and will not be described in detail herein again.

The first data collection unit 21 is disposed with a second data bus and a second data bus inversion control line, and configured to collect n pieces of data through the second data bus each time to accumulatively collect n*b pieces of data, the first set of check data, and the second set of check data, and collect second inversion control data corresponding to every n pieces of data through the second data bus inversion control line.

As shown in FIG. 1, the second data bus is connected to the first data bus of the data output circuit 1 and the second data bus inversion control line DBI2 is connected to the first data bus inversion control line DBI1 of the data output circuit 1, so the data transmitted by the second data bus comes from the first data output unit 13, and the second inversion control data transmitted by the second data bus inversion control line also comes from the first data output unit 13, that is, the first inversion control data output by the first data output unit 13.

For example, the first data collection unit 21 collects the n*b=8*8 pieces of data, the first set of check data NewCRC[10], NewCRC[11], NewCRC[12], NewCRC[13], NewCRC[14], NewCRC[15], NewCRC[16], and NewCRC[17], and the second set of check data NewCRC[20], NewCRC[21], NewCRC[22], NewCRC[23], NewCRC[24], NewCRC[25], NewCRC[26], and NewCRC[27], for example, the data in the first column to the tenth column described in Table 2, from the first data output unit 13. Meanwhile, the first data collection unit 21 further collects the first inversion control data, for example, the tenth first inversion control data described in Table 3, output from the first data output unit 13.

Preferably, the data collection unit 21 may further include a first timing correction circuit. The first timing correction circuit is configured to correct timing according to the write data collection signal from the second data bus, so as to correctly collect the data from the first data bus and the inversion control data from the first data bus inversion control line. For example, the first timing correction circuit corrects the timing according to a write data collection signal from DQS2 in the second data bus.

It should be noted that, those skilled in the art should understand a circuit structure of the first timing correction circuit according to the foregoing description, so the circuit structure will not be described in detail herein again.

Preferably, the first data collection unit includes a first collection sub-unit. The first collection sub-unit is disposed with a second data bus and a second data bus inversion control line, and configured to collect n pieces of data through the second data bus each time, and meanwhile, collect second inversion control data corresponding to the n pieces of data through the second data bus inversion control line, and regard data collected after the $b^{th}$ time of collection as the first set of check data and the second set of check data.

For example, the first collection sub-unit collects n pieces of data, for example, the data in the first column in Table 2, output from the first data output unit 13 at the first rising edge of the write data collection signal through DQ2[7:0] in the second data bus according to the write data collection signal from DQS2 in the second data bus at the first time, and meanwhile, collects the first inversion control data, for example, the first piece of data D64 in Table 3, from the first data output unit 13 through the second data bus inversion control line DBI2. Then, the first collection sub-unit collects n pieces of data, for example, the data in the second column in Table 2, output from the first data output unit 13 at the first falling edge of the write data collection signal through the DQ2[7:0] in the second data bus at the second time, and meanwhile, collects the first inversion control data, for example, the second piece of data D65 in Table 3, from the first data output unit 13 through the second data bus inversion control line DBI2. Then, the first collection sub-unit collects n pieces of data, for example, the data in the eighth column in Table 2, output from the first data output unit 13 at the fourth falling edge of the write data collection signal through the DQ2[7:0] in the second data bus at the eighth time, and meanwhile, collects the first inversion control data, for example, the eighth piece of data D71 in Table 2, from the first data output unit 13 through the second data bus inversion control line DBI2. After the b=8th time of collection, the first collection sub-unit collects the first set of check data and the second set of check data, for example, the data in the ninth column in Table 2, from the first data output unit 13 at the fifth rising edge of the write data collection signal through the DQ2[7:0] in the second data bus at the ninth time, and meanwhile, collects the first inversion control data, for example, the ninth piece of data 1 in Table 2, from the first data output unit 13 through the second data bus inversion control line DBI2. Finally, the first collection sub-unit collects the first set of check data and the second set of check data, for example, the data in the tenth column in Table 2, at the fifth falling edge of the write data collection signal through the DQ2[7:0] in the second data bus at the tenth time, and meanwhile, collects the first inversion control data, for example, the tenth piece of data 1 in Table 2, from the first data output unit 13 through the second data bus inversion control line DBI2.

The first data restoration unit 22 is connected to an output end of the data collection unit 21, and configured to, when the second inversion control data from the data collection unit 21 is of the first numerical value, negate the n pieces of data corresponding to the inversion control data and output the n pieces of negated data; otherwise, directly output the n pieces of data.

For example, the first numerical value is "0".

Preferably, the data restoration unit 22 may include n (for example, nn=8) second combinational logical circuits with a logical relationship of $\overline{A2B2}+A2B2$. In each of the second combinational logical circuits, A2 is the second inversion control data from the data collection unit 21, and B2 is one of the n pieces of data from the data collection unit. Therefore, when the second inversion control data A2=0, each of the second combinational logical circuits outputs $\overline{A2B2}+A2B2=\overline{B2}$, that is, outputs inverse data of corresponding data in the n pieces of data from the data collection unit respectively; and when the second inversion control data A2=1, each of the second combinational logical circuits outputs $\overline{A2B2}+A2B2=B2$, that is, outputs the corresponding data in the n pieces of data from the data collection unit respectively.

For example, data output by the data restoration unit 22 at the first time to the tenth time are described in Table 4, where data in the first row to the fourth row in the ninth column and the tenth column is the first set of check data, and data in the fifth row to the eighth row in the ninth column and the tenth column is the second set of check data.

TABLE 4

| D0' | D1' | D2' | D3' | D4' | D5' | D6' | D7' | NewCRC[10] | NewCRC[14] |
|---|---|---|---|---|---|---|---|---|---|
| D8' | D9' | D10' | D11' | D12' | D13' | D14' | D15' | NewCRC[11] | NewCRC[15] |
| D16' | D17' | D18' | D19' | D20' | D21' | D22' | D23' | NewCRC[12] | NewCRC[16] |
| D24' | D25' | D26' | D27' | D28' | D29' | D30' | D31' | NewCRC[13] | NewCRC[17] |
| D32' | D33' | D34' | D35' | D36' | D37' | D38' | D39' | NewCRC[20] | NewCRC[24] |
| D40' | D41' | D42' | D43' | D44' | D45' | D46' | D47' | NewCRC[21] | NewCRC[25] |
| D48' | D49' | D50' | D51' | D52' | D53' | D54' | D55' | NewCRC[22] | NewCRC[26] |
| D56' | D57' | D58' | D59' | D60' | D61' | D62' | D63' | NewCRC[23] | NewCRC[27] |

The write unit 23 is connected to an output end of the data restoration unit 22, and configured to write the n1*b pieces of data in the n*b pieces of data and the first set of check data from the data restoration unit 22 into one memory chip through a third data bus, and write the nn2*b pieces of data in the n*b pieces of data and the second set of check data from the data restoration unit 22 into the other memory chip through the third data bus.

For example, preferably, at the rising edge or falling edge of the generated write data collection signal output from DQS3 in the third data bus, the write unit 23 writes the n1*b pieces of data and the first set of check data, for example, data in the first row to the fourth row in the first column to the tenth column in Table 4, from the data restoration unit 22 into the memory chip 31 through DQ3[3:0] in the third data bus, and writes the n2*b pieces of data and the second set of check data, for example, data in the fifth row to the eighth row in the first column to the tenth column in Table 4, from the data restoration unit 22 into the memory chip 32 through DQ3[7:4] in the third data bus.

Those skilled in the art should understand that, the write unit 23 can generate the write data collection signal output from the DQS3 in the third data bus by delaying the write data collection signal from the DQS2 in the second data bus, and details will not be described herein again.

Figure 2:
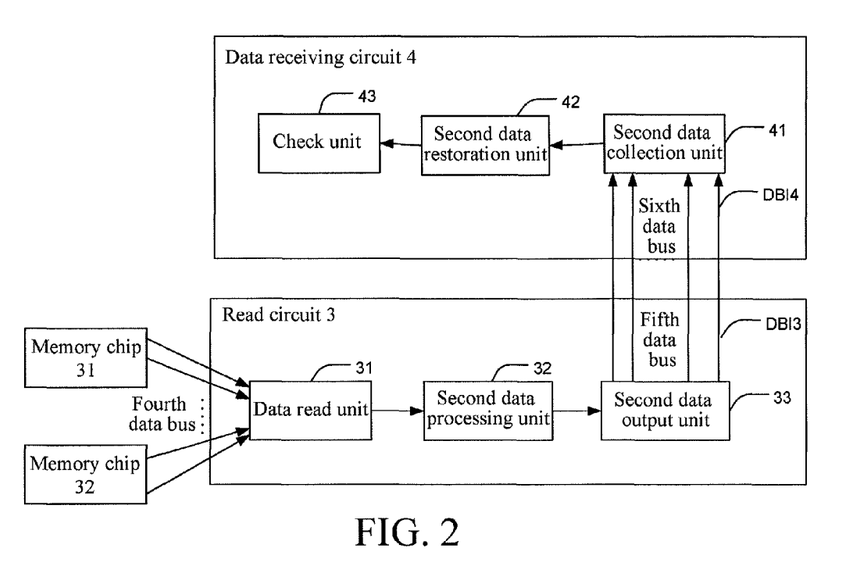
FIG. 2 is a schematic diagram of a data read/write system for reading data from a memory chip according to a preferred embodiment of the present invention.

FIG. 2 is a schematic diagram of a data read/write system for reading data from a memory chip according to a preferred embodiment of the present invention. The data read/write system includes a read circuit 3 and a data receiving circuit 4. The read circuit 3 includes a data read unit 31, a second data processing unit 32, and a second data output unit 33. The data receiving circuit 4 includes a second data collection unit 41, a second data restoration unit 42, and a check unit 43.

The data read unit 31 is disposed with a fourth data bus connected to two memory chips, and configured to read n1*b pieces of data and a third set of check data from one memory chip and read n2*b pieces of data and a fourth set of check data from the other memory chip through the fourth data bus.

For example, the data read unit 31 reads n1*b=4*8 pieces of data and a third set of check data NewCRC[10]', NewCRC[11]', NewCRC[12]', NewCRC[13]', NewCRC[14]', NewCRC[15]', NewCRC[16]', and NewCRC[17]', for example, data in the first row to the fourth row in Table 5, from a memory chip 31 through DQ4[3:0] in the fourth data bus; and moreover, the data read unit 31 further reads n2*b=4*8 pieces of data and a fourth set of check data NewCRC[20]', NewCRC[21]', NewCRC[22]', NewCRC[23]', NewCRC[24]', NewCRC[25]', NewCRC[26]', and NewCRC[27]', for example, data in the fifth row to the eighth row in Table 5, from a memory chip 32 through DQ4[7:4] in the fourth data bus.

TABLE 5

| D0" | D1" | D2" | D3" | D4" | D5" | D6" | D7" | NewCRC[10]' | NewCRC[14]' |
|---|---|---|---|---|---|---|---|---|---|
| D8" | D9" | D10" | D11" | D12" | D13" | D14" | D15" | NewCRC[11]' | NewCRC[15]' |
| D16" | D17" | D18" | D19" | D20" | D21" | D22" | D23" | NewCRC[12]' | NewCRC[16]' |
| D24" | D25" | D26" | D27" | D28" | D29" | D30" | D31" | NewCRC[13]' | NewCRC[17]' |
| D32" | D33" | D34" | D35" | D36" | D37" | D38" | D39" | NewCRC[20]' | NewCRC[24]' |
| D40" | D41" | D42" | D43" | D44" | D45" | D46" | D47" | NewCRC[21]' | NewCRC[25]' |
| D48" | D49" | D50" | D51" | D52" | D53" | D54" | D55" | NewCRC[22]' | NewCRC[26]' |
| D56" | D57" | D58" | D59" | D60" | D61" | D62" | D63" | NewCRC[23]' | NewCRC[27]' |

Preferably, the data read unit includes a second timing correction circuit, configured to correct timing according to a read data collection signal from the fourth data bus, so as to accurately read data through the fourth data bus. For example, the second timing correction circuit corrects the timing according to a read data collection signal from DQS4 in the fourth data bus.

It should be noted that, those skilled in the art should understand a circuit structure of the second timing correction circuit according to the foregoing description, so the circuit structure will not be described in detail herein again.

Preferably, the data read unit 31 includes a read sub-unit. The read sub-unit is configured to read n1 pieces of data from one memory chip and read n2 pieces of data from the other memory chip through the fourth data bus each time, and then output the n1 pieces of data and the n2 pieces of data. After the $b^{th}$ time of read, the read sub-unit reads the third set of check data from one memory chip and reads the fourth set of check data from the other memory chip.

For example, at the first rising edge of the read data collection signal from the DQS4 in the fourth data bus, the read sub-unit reads n1=4 pieces of data, for example, data in the first row to the fourth row in the first column in Table 5, from the memory chip 31 through the DQ4[3:0] in the fourth data bus, and reads n2=4 pieces of data, for example, data in the fifth row to the eighth row in the first column in Table 5, from the memory chip 32 through the DQ4[7:4] in the fourth data bus at the first time. Then, at the first falling edge of the read data collection signal, the read sub-unit reads n1=4 pieces of data, for example, data in the first row to the fourth row in the second column in Table 5, from the memory chip 31 through the DQ4[3:0] in the fourth data bus, and reads n2=4 pieces of data, for example, data in the fifth row to the eighth row in the second column in Table 5, from the memory chip 32 through the DQ4[7:4] in the fourth data bus at the second time. Then, at the fourth falling edge of the read data collection signal, the read sub-unit reads n1=4 pieces of data, for example, data in the first row to the fourth row in the eighth column in Table 5, from the memory chip 31 through the DQ4[3:0] in the fourth data bus, and reads n2=4 pieces of data, for example, data in the fifth row to the eighth row in the eighth column in Table 5, from the memory chip 32 through the DQ4[7:4] in the fourth data bus at the eighth time. After the b=8th time of read, at the fifth rising edge of the read data collection signal, the read sub-unit reads the third set of check data, for example, data (NewCRC[10]', NewCRC[11]', NewCRC[12]', and NewCRC[13]') in the first row to the fourth row in the ninth column in Table 5, from the memory chip 31 through the DQ4[3:0] in the fourth data bus, and reads a fourth set of check data, for example, data (NewCRC[20]', NewCRC[21]', NewCRC[22]', and NewCRC[23]') in the fifth row to the eighth row in the ninth column in Table 5, from the memory chip 32 through the DQ4[7:4] in the fourth data bus at the ninth time. Then, at the fifth falling edge of the read data collection signal, the read sub-unit reads the third set of check data, for example, data (NewCRC[14]', NewCRC[15]', NewCRC[16]', and NewCRC[17]') in the first row to the fourth row in the tenth column in Table 5, from the memory chip 31 through the DQ4[3:0] in the fourth data bus, and reads the fourth set of check data, for example, data (NewCRC[24]', NewCRC[25]', NewCRC[26]', and NewCRC[27]') in the fifth row to the eighth row in the tenth column in Table 5, from the memory chip 32 through the DQ4[7:4] in the fourth data bus at the tenth time.

The second data processing unit 32 is connected to an output end of the data read unit 31, and configured to: determine third inversion control data corresponding to every n pieces of data in the n*b pieces of data from the data read unit; determine third inversion control data corresponding to every n pieces of data in data formed by the third set of check data and the fourth set of check data to be of the second numerical value; when the determined third inversion control data is of the first numerical value, negate n pieces of data corresponding to the third inversion control data and then output the n pieces of negated data; otherwise, directly output the n pieces of data; and output the third inversion control data corresponding to the every n pieces of data, where n=n1+n2.

For example, the first numerical value is 0.

The second data processing unit 32 determines third inversion control data corresponding to every n=8 pieces of data in the n*b pieces of data, for example, n*b=8*8 pieces of data in the first column to the eighth column described in Table 5, from the data read unit 31; when the determined third inversion control data is of the first numerical value, negate n=8 pieces of data corresponding to the third inversion control data and then output the n pieces of negated data; otherwise, directly output the n=8 pieces of data, and output the third inversion control data corresponding to the every n=8 pieces of data; and determine third inversion control data corresponding to every n pieces of data, for example, data in the ninth column and the tenth column described in Table 5, in the data formed by the third set of check data and the fourth set of check data to be the second numerical value.

The circuit structure and a working principle of the second data processing unit 32 are the same as or similar to those of the first data processing unit 12, which are incorporated herein by reference and will not be described again.

The second data output unit 33 is connected to an output end of the second data processing unit 32, and configured to output n pieces of data from the second data processing unit 32 through the fifth data bus each time to accumulatively output the n*b pieces of data, the third set of check data, and the fourth set of check data. Whenever the n pieces of data are output, the third inversion control data corresponding to the n pieces of data is output through the third data bus inversion control line.

For example, preferably, the second data output unit 33 outputs a generated read data collection signal through DQS5 in the fifth data bus, and at the first rising edge of the read data collection signal, outputs n=8 pieces of data, for example, data in the first column in Table 6, in the n*b=8*8 pieces of data from the second data processing unit 32 through DQ5[7:0] in the fifth data bus, and outputs third inversion control data, for example, a first piece of data D64' in Table 7, corresponding to the n=8 pieces of data through the third data bus inversion control line DBI3 at the first time. Then, at the first falling edge of the read data collection signal, the second data output unit 33 outputs n=8 pieces of data, for example, data in the second column in Table 6, in the n*b=8*8 pieces of data from the second data processing unit 32 through the DQ5[7:0] in the fifth data bus, and outputs third inversion control data, for example, a second piece of data D65' in Table 7, corresponding to the n=8 pieces of data through the third data bus inversion control line DBI3 at the second time. At the fourth falling edge of the read data collection signal, the second data output unit 33 outputs n=8 pieces of data, for example, data in the eighth column in Table 6, and outputs third inversion control data, for example, the eighth piece of data D71' in Table 7, corresponding to the n=8 pieces of data through the third data bus inversion control line DBI3 at the b=8th time. Then, at the fifth rising edge of the read data collection signal, the second data output unit 33 outputs the third set of check data (for example, data in the first row to the fourth row in a ninth column in Table 6) from the data read unit 31 through DQ5[3:0] in the fifth data bus, outputs a fourth set of check data (for example, data in the fifth row to the eighth row in the ninth column in Table 6) from the data read unit 31 through DQ5[7:4] in the fifth data bus, and outputs third inversion control data, for example, the ninth piece of data 1 in Table 7, corresponding to the n=8 pieces of check data through the third data bus inversion control line DBI3 at the ninth time. Then, at the fifth falling edge of the read data collection signal, the second data output unit 33 outputs a third set of check data (for example, data in the first row to the fourth row in the tenth column in Table 6) from the data read unit 31 through the DQ5[3:0] in the fifth data bus, outputs a fourth set of check data (for example, data in the fifth row to the eighth row in the tenth column in Table 6) from the data read unit 31 through the DQ5[7:4] in the fifth data bus, and outputs third inversion control data, for example, the tenth piece of data 1 in Table 7, corresponding to the n=8 pieces of check data through the third data bus inversion control line DBI3 at the tenth time.

TABLE 6

| d0' | d1' | d2' | d3' | d4' | d5' | d6' | d7' | NewCRC[10]' | NewCRC[14]' |
|---|---|---|---|---|---|---|---|---|---|
| d8' | d9' | d10' | d11' | d12' | d13' | d14' | d15' | NewCRC[11]' | NewCRC[15]' |
| d16' | d17' | d18' | d19' | d20' | d21' | d22' | d23' | NewCRC[12]' | NewCRC[16]' |

TABLE 6-continued

| | | | | | | | | | |
|---|---|---|---|---|---|---|---|---|---|
| d24' | d25' | d26' | d27' | d28' | d29' | d30' | d31' | NewCRC[13]' | NewCRC[17]' |
| d32' | d33' | d34' | d35' | d36' | d37' | d38' | d39' | NewCRC[20]' | NewCRC[24]' |
| d40' | d41' | d42' | d43' | d44' | d45' | d46' | d47' | NewCRC[21]' | NewCRC[25]' |
| d48' | d49' | d50' | d51' | d52' | d53' | d54' | d55' | NewCRC[22]' | NewCRC[26]' |
| d56' | d57' | d58' | d59' | d60' | d61' | d62' | d63' | NewCRC[23]' | NewCRC[27]' |

TABLE 7

| D64' | D65' | D66' | D67' | D68' | D69' | D70' | D71' | 1 | 1 |
|---|---|---|---|---|---|---|---|---|---|

Those skilled in the art should understand that, the second data output unit 33 can generate the read data collection signal output from the DQS5 in the fifth data bus by delaying the read data collection signal from the fourth data bus, and details will not be described herein again.

The second data collection unit 41 is disposed with a sixth data bus and a fourth data bus inversion control line, and configured to collect n pieces of data through the sixth data bus each time to accumulatively collect n*b pieces of data, the third set of check data, and the fourth set of check data, and collect fourth inversion control data corresponding to every n pieces of data through the fourth data bus inversion control line.

As shown in FIG. 2, the sixth data bus is connected to the fifth data bus, and the fourth data bus inversion control line DBI4 is connected to the third data bus inversion control line DBI3. Therefore, the n*b pieces of data, the third set of check data, and the fourth set of check data collected by the second data collection unit 41 through the sixth data bus and the fourth inversion control data collected by the second data collection unit 41 through the fourth data bus inversion control line all come from the second data output unit 33.

For example, the second data collection unit 41 collects the n*b=8*8 pieces of data, the third set of check data and the fourth set of check data, as described in Table 6, from the second data output unit 33 through the sixth data bus, and collects the fourth inversion control data, as described in Table 7, corresponding to the every n=8 pieces of data in the n*b=8*8 pieces of data, from the second data output unit 33 through the fourth data bus inversion control line.

Preferably, the second data collection unit 41 includes a third timing correction circuit, configured to correct timing according to a read data collection signal from the sixth data bus, so as to accurately collect data through the sixth data bus. For example, the third timing correction circuit corrects the timing according to a read data collection signal from DQS6 in the sixth data bus.

It should be noted that, those skilled in the art should understand a circuit structure of the third timing correction circuit according to the foregoing description, so the circuit structure will not be described in detail herein again.

More preferably, the second data collection unit 41 includes a second collection sub-unit. The second collection sub-unit is disposed with a sixth data bus and a fourth data bus inversion line, and configured to collect n pieces of data through the sixth data bus each time, and meanwhile, collect fourth inversion control data corresponding to the n pieces of data through the fourth data bus inversion control line, and use data collected through the sixth data bus twice after the $b^{th}$ time as the third set of check data and the fourth set of check data.

For example, the second collection sub-unit collects n pieces of data, for example, the data in the first column in Table 6, output from the second data output unit 33 at the first rising edge of the read data collection signal through DQ6[7:0] in the sixth data bus according to the read data collection signal from the DQS6 in the sixth data bus at the first time, and meanwhile, collects the third inversion control data, for example, the first piece of data D64' in Table 7, from the second data output unit 33 through the fourth data bus inversion control line DBI4. Then, the second collection sub-unit collects n pieces of data, for example, the data in the second column in Table 6, output from the second data output unit 33 at the first falling edge of the read data collection signal through the DQ6[7:0] in the sixth data bus at the second time, and meanwhile, collects the third inversion control data, for example, the second piece of data D65' in Table 7, from the second data output unit 33 through the fourth data bus inversion control line DBI4. Then, the second collection sub-unit collects n pieces of data, for example, the data in the eighth column in Table 6, output from the second data output unit 33 at the fourth falling edge of the read data collection signal through the DQ6[7:0] in the sixth data bus at the eighth time, and meanwhile, collects the third inversion control data, for example, the eighth piece of data D71' in Table 7, from the second data output unit 33 through the fourth data bus inversion control line DBI4. Then, after the b=8th time of collection, the second collection sub-unit collects the third set of check data and the fourth set of check data, for example, the data in the ninth column in Table 6, at the fifth rising edge of the read data collection signal through the DQ6[7:0] in the sixth data bus at the ninth time, and meanwhile, collects the third inversion control data, for example, the ninth piece of data 1 in Table 7, from the second data output unit 33 through the fourth data bus inversion control line DBI4. Finally, the second collection sub-unit collects the third set of check data and the fourth set of check data, for example, the data in the tenth column in Table 6, at the fifth falling edge of the read data collection signal through the DQ6[7:0] in the sixth data bus at the tenth time, and meanwhile, collects the third inversion control data, for example, the tenth piece of data 1 in Table 7, from the second data output unit 33 through the fourth data bus inversion control line DBI4.

The second data restoration unit 42 is connected to an output end of the second data collection unit 41, and configured to, when the fourth inversion control data is of the first numerical value, negate the n pieces of data corresponding to the fourth inversion control data and output the n pieces of negated data; otherwise, directly output the n pieces of data.

For example, the first numerical value is 0.

For example, the second data restoration unit 42 processes every n pieces of data, for example, the data in the first column to the tenth column described in Table 6, from the second data collection unit 41 according to the fourth inversion control data, for example, the fourth inversion control data described in Table 7, from the second data collection unit 41.

A circuit structure of the second data restoration unit 42 is the same as or similar to that of the first data restoration unit 22, which is incorporated herein by reference and will not be described again.

The check unit 43 is connected to an output end of the second data restoration unit 42, and configured to check whether the n1*b pieces of data in the n*b pieces of data from the second data restoration unit 42 is faulty according to the third set of check data from the second data restoration unit 42, and check whether the n2*b pieces of data in the n*b pieces of data from the second data restoration unit 42 is faulty according to the fourth set of check data from the second data restoration unit 42, so as to check whether the n*b pieces of data from the second data collection unit is faulty.

A circuit structure of the check unit 43 is determined according to a manner for the check data generation unit 11 to generate the two sets of check data. For example, if the check data generation unit 11 generates check data through a cyclic redundancy check data generation circuit, accordingly, the check unit 43 includes a circuit for generating check data to be compared and a check data comparison circuit. Preferably, the circuit for generating check data to be compared includes the cyclic redundancy check data generation circuit.

For example, the n*b pieces of data, the third set of check data, and the fourth set of check data from the second data restoration unit 42 are described in Table 8.

TABLE 8

| D0''' | D1''' | D2''' | D3''' | D4''' | D5''' | D6''' | D7''' | NewCRC[10]' | NewCRC[14]' |
| D8''' | D9''' | D10''' | D11''' | D12''' | D13''' | D14''' | D15''' | NewCRC[11]' | NewCRC[15]' |
| D16''' | D17''' | D18''' | D19''' | D20''' | D21''' | D22''' | D23''' | NewCRC[12]' | NewCRC[16]' |
| D24''' | D25''' | D26''' | D27''' | D28''' | D29''' | D30''' | D31''' | NewCRC[13]' | NewCRC[17]' |
| D32''' | D33''' | D34''' | D35''' | D36''' | D37''' | D38''' | D39''' | NewCRC[20]' | NewCRC[24]' |
| D40''' | D41''' | D42''' | D43''' | D44''' | D45''' | D46''' | D47''' | NewCRC[21]' | NewCRC[25]' |
| D48''' | D49''' | D50''' | D51''' | D52''' | D53''' | D54''' | D55''' | NewCRC[22]' | NewCRC[26]' |
| D56''' | D57''' | D58''' | D59''' | D60''' | D61''' | D62''' | D63''' | NewCRC[23]' | NewCRC[27]' |

One set of cyclic redundancy check data generation circuits generate a first set of check data to be compared, NewCRC[10]'', NewCRC[11]'', NewCRC[12]'', NewCRC[13]'', NewCRC[14]'', NewCRC[15]'', NewCRC[16]'', and NewCRC[17]'', according to n1*b pieces of data, for example, data D0''' to D31''' in a first row to a fourth row, in Table 8. The other set of cyclic redundancy check data generation circuits generate a second set of check data to be compared, NewCRC[20]'', NewCRC[21]'', NewCRC[22]'', NewCRC[23]'', NewCRC[24]'', NewCRC[25]'', NewCRC[26]'', and NewCRC[27]'', according to the remaining n2*b pieces of data, for example, data D32''' to D63''' in a fifth row to an eighth row, in the n*b pieces of data to be output.

Preferably, the generation circuits for generating the first set of check data to be compared according to the data D0''' to D31''' described in Table 8 include a combinational logical circuit with a logical relationship shown in Equation 3, and the generation circuits for generating the second set of check data to be compared according to the data D32''' to D63''' described in Table 8 include a combinational logical circuit with a logical relationship shown in Equation 4.

NewCRC[10]
"=1^1^1^1^1^1^1^1^1^1^1^1^1^1^1^1^1^1^1^1^
[D31''']^[D30''']^[D28''']^[D23''']^[D21''']^[D19''']^
[D18''']^[D16''']^[D14''']^[D12''']^[D8''']^[D7''']^
[D6''']^[D0''']];

NewCRC[11]
"=1^1^1^1^1^1^1^1^1^1^1^1^1^1^1^1^1^1^1^1^
[D30''']^[D29''']^[D28''']^[D24''']^[D23''']^[D22''']^
[D21''']^[D20''']^[D18''']^[D17''']^[D16''']^[D15''']^
[D14''']^[D13''']^[D12''']^[D9''']^[D6''']^[D1''']^
[D0''']];

NewCRC[12]
"=1^1^1^1^1^1^1^1^1^1^1^1^1^1^1^1^1^1^1^1^
[D29''']^[D28''']^[D25''']^[D24''']^[D22''']^[D17''']^
[D15''']^[D13''']^[D12''']^[D10''']^[D8''']^[D6']^
[D2''']^[D1''']^[D0''']];

NewCRC[13]"-
1^1^1^1^1^1^1^1^1^1^1^1^1^1^1^1^1^1^1^1^[D30''']^
^[D29''']^[D26''']^[D25''']^[D23''']^[D18''']^[D16''']^
^[D14''']^[D13''']^[D11''']^[D9''']^[D7''']^[D3''']^
[D2''']^[D1''']];

NewCRC[14]
"=1^1^1^1^1^1^1^1^1^1^1^1^1^1^1^1^1^1^1^1^
[D31''']^[D30''']^[D27''']^[D26''']^[D24''']^[D19''']^
[D17''']^[D15''']^[D14''']^[D12''']^[D10''']^[D8''']^
[D4''']^[D3''']^[D2''']];

NewCRC[15]
"=1^1^1^1^1^1^1^1^1^1^1^1^1^1^1^1^1^1^1^1^
[D31''']^[D28''']^[D27''']^[D25''']^[D20''']^[D18''']^
[D16''']^[D15''']^[D13''']^[D11''']^[D9''']^[D5''']^
[D4''']^[D3''']];

NewCRC[16]
"=1^1^1^1^1^1^1^1^1^1^1^1^1^1^1^1^1^1^1^1^
[D29''']^[D28''']^[D26''']^[D21''']^[D19''']^[D17''']^
[D16''']^[D14''']^[D12''']^[D10''']^[D6''']^[D5''']^
[D4''']];

NewCRC[17]
"=1^1^1^1^1^1^1^1^1^1^1^1^1^1^1^1^1^1^1^1^
[D30''']^[D29''']^[D27''']^[D22''']^[D20''']^[D18''']^
[D17''']^[D15''']^[D13''']^[D11''']^[D7''']^[D6''']^
[D5'''];                                     Equation 3:

NewCRC[20]
"=1^1^1^1^1^1^1^1^1^1^1^1^1^1^1^1^1^1^1^1^
[D63''']^[D62''']^[D60''']^[D55''']^[D53''']^[D51''']^
[D50''']^[D48''']^[D46''']^[D44''']^[D40''']^[D39''']^
[D38''']^[D32''']];

New1^1^1^1^1^1^CRC[21]
"=1^1^1^1^1^1^1^1^1^1^1^1^[D62''']^[D61''']^
[D60''']^[D56''']^[D55''']^[D54''']^[D53''']^[D52''']^
[D50''']^[D49''']^[D48''']^[D47''']^[D46''']^[D45''']^
[D44''']^[D41''']^[D38''']^[D33''']^[D32''']];

NewCRC[22]
"=1^1^1^1^1^1^1^1^1^1^1^1^1^1^1^1^1^1^1^1^
[D61''']^[D60''']^[D57''']^[D56''']^[D54''']^[D49''']^
[D47''']^[D45''']^[D44''']^[D42''']^[D40''']^[D38''']^
[D34''']^[D33''']^[D32''']];

NewCRC[23]
"=1^1^1^1^1^1^1^1^1^1^1^1^1^1^1^1^1^
[D62'"]^[D61'"]^[D58'"]^[D57'"]^[D55'"]^[D50'"]^
[D48'"]^[D46'"]^[D45'"]^[D43'"]^[D41'"]^[D39'"]^
[D35'"]^[D34'"]^[D33'"];

NewCRC[24]
"=1^1^1^1^1^1^1^1^1^1^1^1^1^1^1^1^1^
[D63'"]^[D62'"]^[D59'"]^[D58'"]^[D56'"]^[D51'"]^
[D49'"]^[D47'"]^[D46'"]^[D44'"]^[D42'"]^[D40'"]^
[D36'"]^[D35'"]^[D34'"];

NewCRC[25]
"=1^1^1^1^1^1^1^1^1^1^1^1^1^1^1^1^1^
[D63'"]^[D60'"]^[D59'"]^[D57'"]^[D52'"]^[D50'"]^
[D48'"]^[D47'"]^[D45'"]^[D43'"]^[D41'"]^[D37'"]^
[D36'"]^[D35'"];

NewCRC[26]
"=1^1^1^1^1^1^1^1^1^1^1^1^1^1^1^1^1^
[D61'"]^[D60'"]^[D58'"]^[D53'"]^[D51'"]^[D49'"]^
[D48'"]^[D46'"]^[D44'"]^[D42'"]^[D38'"]^[D37'"]^
[D36'"];

NewCRC[27]
"=1^1^1^1^1^1^1^1^1^1^1^1^1^1^1^1^1^
[D62'"]^[D61'"]^[D59'"]^[D54'"]^[D52'"]^[D50'"]^
[D49'"]^[D47'"]^[D45'"]^[D43'"]^[D39'"]^[D38'"]^
[D37']                                    Equation 4:

The check data comparison circuit is connected to an output end of the circuit for generating check data to be compared, and configured to compare the first set of check data to be compared with the third set of check data from the data restoration unit, and compare the second set of check data to be compared with the fourth set of check data from the data restoration unit, so as to output a check result for indicating whether the n*b pieces of data from the data restoration unit is correct.

For example, the check data comparison circuit is configured to compare the first set of check data to be compared, NewCRC[10]", NewCRC[11]", NewCRC[12]", NewCRC[13]", NewCRC[14]", NewCRC[15]", NewCRC[16]", and NewCRC[17]", with the third set of check data, NewCRC[10]', NewCRC[11]', NewCRC[12]', NewCRC[13]', NewCRC[14]', NewCRC[15]', NewCRC[16]', and NewCRC[17]', from the data restoration unit 42, and compare the second set of check data to be compared, NewCRC[20]', NewCRC[21]', NewCRC[22]', NewCRC[23]', NewCRC[24]", NewCRC[25]", NewCRC[26]", and NewCRC[27]", with the fourth set of check data, NewCRC[20]', NewCRC[21]', NewCRC[22]', NewCRC[23]', NewCRC[24]', NewCRC[25]', NewCRC[26]', and NewCRC[27]', from the data restoration unit 42, so as to output a check result for indicating whether the n*b=8*8 pieces of data from the data restoration unit is correct.

Preferably, the check data comparison circuit includes sixteen 2-input exclusive NOR gate circuits and a 16-input logical AND gate circuit. The first 2-input exclusive NOR gate circuit receives the first set of check data to be compared NewCRC[10]" and the third set of check data NewCRC[10]' from the data restoration unit. The second 2-input exclusive NOR gate circuit receives the second check data to be compared NewCRC[11]" and the third set of check data NewCRC[11]' from the data restoration unit. The third 2-input exclusive NOR gate circuit receives the second check data to be compared NewCRC[12]" and the third set of check data NewCRC[12]' from the data restoration unit. The fourth 2-input exclusive NOR gate circuit receives the second check data to be compared NewCRC[13]" and the third set of check data NewCRC[13]' from the data restoration unit. The fifth 2-input exclusive NOR gate circuit receives the second check data to be compared NewCRC[14]" and the third set of check data NewCRC[14]' from the data restoration unit. The sixth 2-input exclusive NOR gate circuit receives the second check data to be compared NewCRC[15]" and the third set of check data NewCRC[15]' from the data restoration unit. The seventh 2-input exclusive NOR gate circuit receives the second check data to be compared NewCRC[16]" and the third set of check data NewCRC[16]' from the data restoration unit. The eighth 2-input exclusive NOR gate circuit receives the second check data to be compared NewCRC[17]" and the third set of check data NewCRC[17]' from the data restoration unit. The ninth 2-input exclusive NOR gate circuit receives the second set of check data to be compared NewCRC[20]" and the fourth set of check data NewCRC[20]' from the data restoration unit. The tenth 2-input exclusive NOR gate circuit receives the second check data to be compared NewCRC[21]" and the fourth set of check data NewCRC[21]' from the data restoration unit. The eleventh 2-input exclusive NOR gate circuit receives the second check data to be compared NewCRC[22]" and the fourth set of check data NewCRC[22]' from the data restoration unit. The twelfth 2-input exclusive NOR gate circuit receives the second check data to be compared NewCRC[23]" and the fourth set of check data NewCRC[23]' from the data restoration unit. The thirteenth 2-input exclusive NOR gate circuit receives the second check data to be compared NewCRC[24]" and the fourth set of check data NewCRC[24]' from the data restoration unit. The fourteenth 2-input exclusive NOR gate circuit receives the second check data to be compared NewCRC[25]" and the fourth set of check data NewCRC[25]' from the data restoration unit. The fifteenth 2-input exclusive NOR gate circuit receives the second check data to be compared NewCRC[26]" and the fourth set of check data NewCRC[26]' from the data restoration unit. The sixteenth 2-input exclusive NOR gate circuit receives the second check data to be compared NewCRC[27]" and the fourth set of check data NewCRC[27]' from the data restoration unit. Output ends of the sixteen 2-input exclusive NOR gate circuits are each connected to one of input ends of the 16-input logical AND gate circuit. Therefore, when at least one piece of data in the first set of check data to be compared is different from corresponding check data in the third set of check data from the data restoration unit, the corresponding exclusive NOR gate circuit outputs a comparison result "0" for indicating that the data is faulty; otherwise, the eight exclusive NOR gates all output a comparison result "1" for indicating that the data is correct. When at least one piece of data in the second set of check data to be compared is different from corresponding check data in the fourth set of check data from the data restoration unit, the corresponding exclusive NOR gate circuit outputs a comparison result "0" for indicating that the data is faulty; otherwise, the eight exclusive NOR gates all output a comparison result "1" for indicating that the data is correct. When the sixteen 2-input exclusive NOR gate circuits all output data "1", the 16-input logical AND gate circuit outputs a second check result "1" for indicating that the data is correct, and otherwise, outputs a second check result "0" for indicating that the data is faulty.

It should be noted that, those skilled in the art should understand that, the described check data comparison circuit is merely exemplary and is not intended to limit the present invention. For example, the check data comparison circuit may also include eight 2-input exclusive NOR gate circuits and eight third combinational logical circuits with a logical relationship of $A3B3C3+\overline{A3B3}C3$. The eight 2-input exclusive NOR gate circuits are configured to compare a set of check data to be compared with the third set of check data from the data restoration unit. In each of the third combinational logical circuits, C3 is data output from one of the eight 2-input exclusive NOR gates, A3 is one piece of data in the second set of check data, and B3 is one piece of data in the fourth set of check data from the data restoration unit corresponding to A3.

In sum, through the data read/write system consistent with the present invention, when data is read or written into the memory chip, especially into a DDR4 X4 memory chip, low power consumption of interface data transmission can be achieved through a data bus inversion control line DBI.

Figure 3:
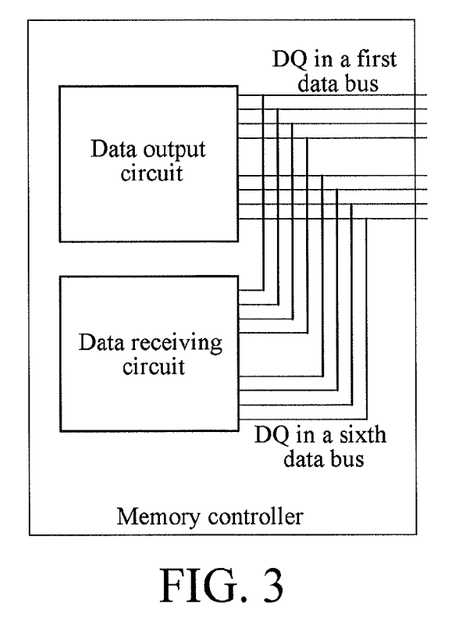
FIG. 3 is a schematic diagram of a memory controller consistent with the present invention.

FIG. 3 is a schematic diagram of a preferred memory controller consistent with the present invention. The memory controller includes the data output circuit 1 in the embodiment shown in FIG. 1, the data receiving circuit 4 in the embodiment shown in FIG. 2, and a first control circuit (not shown). The first data bus of the data output circuit 1 is connected to the sixth data bus of the data receiving circuit 4. The first data bus inversion control line (not shown) of the data output circuit 1 is connected to the fourth data bus inversion control line (not shown) of the data receiving circuit 4. The first control circuit is disposed with a first control signal bus (not shown) and configured to output a control signal including a read/write control instruction.

It should be noted that, those skilled in the art should understand a circuit structure of the first control circuit according to the foregoing description, so the circuit structure will not be described in detail herein again. Moreover, in order to simplify the figure, DQS1 in the first data bus and DQS6 in the sixth data bus are both not shown.

Figure 4:
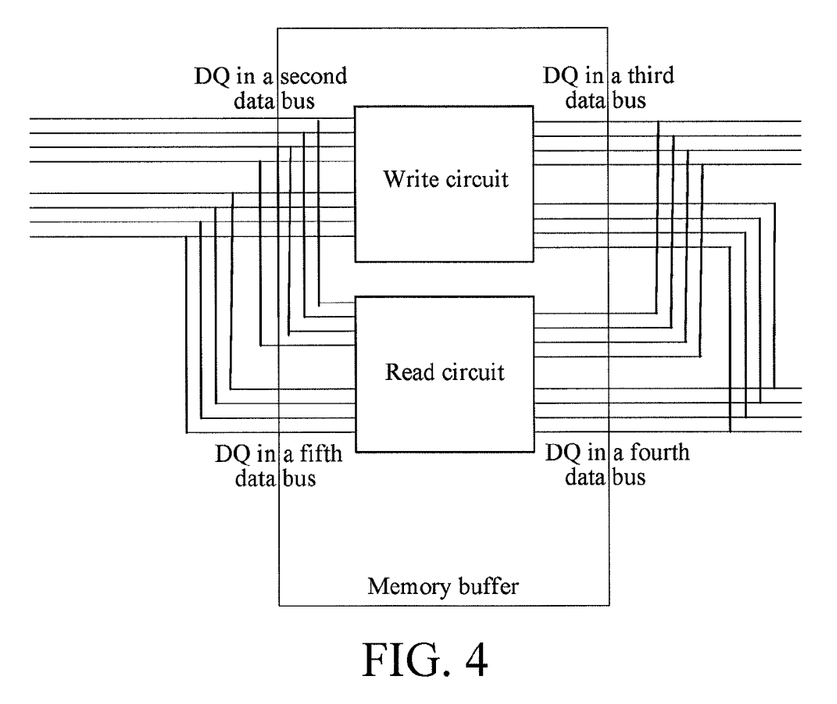
FIG. 4 is a schematic diagram of a memory buffer consistent with the present invention.

FIG. 4 is a schematic diagram of a memory buffer according to a preferred embodiment of the present invention. The memory buffer includes the write circuit 2 in the embodiment shown in FIG. 1, the read circuit 3 in the embodiment shown in FIG. 2, and a second control circuit (not shown). The second data bus included in the write circuit 2 is connected to the fifth data bus included in the read circuit 3. The third data bus included in the write circuit 2 is connected to the fourth data bus included in the read circuit 3. The second data bus inversion control line (not shown) included in the write circuit 2 is connected to the third data bus inversion control line (not shown) included in the read circuit 3. The second control circuit is disposed with a second control signal bus (not shown), configured to control the write circuit 2 and the read circuit 3 according to a received control signal.

When receiving a data write instruction through the second control signal bus, the second control circuit controls the write circuit 2 to perform an operation. When receiving a data read instruction through the second control signal bus, the second control circuit controls the read circuit 3 to perform an operation.

It should be noted that, those skilled in the art should understand a circuit structure of the second control circuit according to the foregoing description, so the circuit structure will not be described in detail herein again. Moreover, in order to simplify the figure, DQS2 in the second data bus, DQS3 in the third data bus, DQS4 in the fourth data bus, and DQS5 in the fifth data bus are all not shown.

Figure 5:
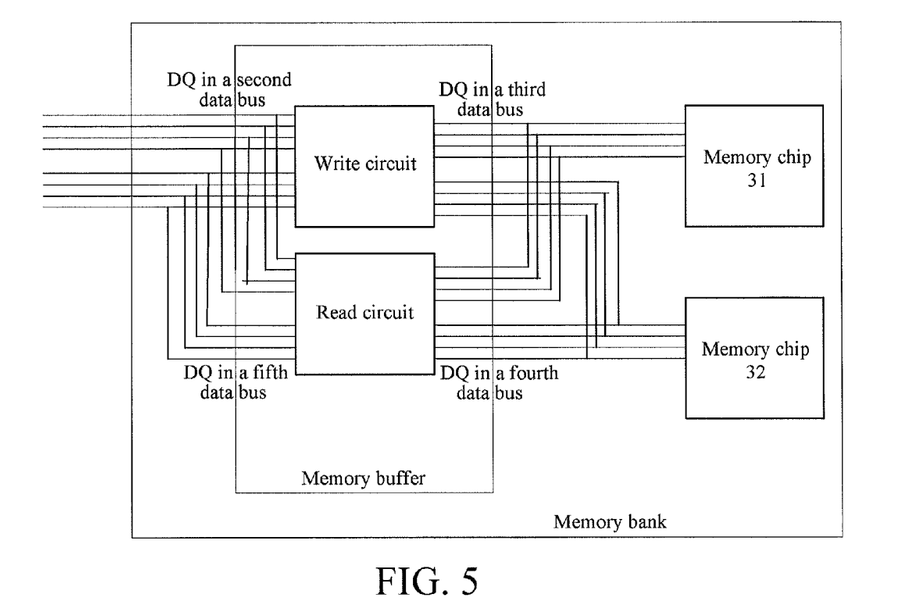
FIG. 5 is a schematic diagram of a memory module consistent with the present invention.

FIG. 5 is a schematic diagram of a memory module according to a preferred embodiment of the present invention. The memory module includes the memory buffer in the embodiment shown in FIG. 4 and at least two memory chips. The third data bus included in the memory buffer is connected to each of the memory chips.

Preferably, the memory chips 31 and 32 are both DDR4 X4 memory chips. It should be noted that, in order to simplify the figure, the second data bus inversion control line, the third data bus inversion control line, and the second control circuit included in the memory buffer are all not shown in FIG. 5.

It should be noted that, those skilled in the art should understand that, the memory module is merely exemplary and is not intended to limit the present invention. In fact, the number and types of the memory chips included in the memory module are not limited to those shown in the figure. Moreover, in order to simplify the figure, DQS1 in the first data bus, DQS2 in the second data bus, DQS3 in the third data bus, DQS4 in the fourth data bus, DQS5 in the fifth data bus, and DQS6 in the sixth data bus are all not shown.

Figure 6:
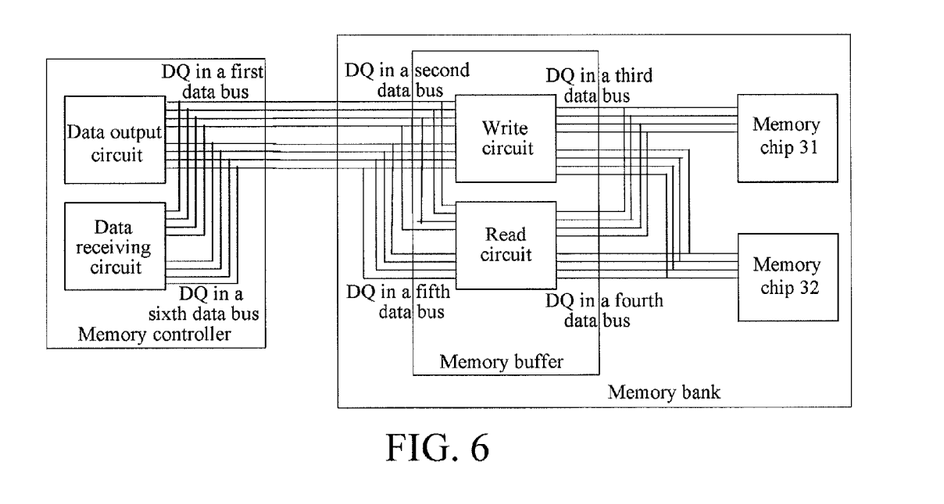
FIG. 6 is a schematic diagram of a data read/write system consistent with the present invention.

FIG. 6 is a data read/write system according to a preferred embodiment of the present invention. The data read/write system includes the memory controller in the embodiment shown in FIG. 3 and the memory module in the embodiment shown in FIG. 5. The second data bus of the memory module is connected to the first data bus of the memory controller. The second data bus inversion control line (not shown) of the memory module is connected to the first data bus inversion control line (not shown) of the memory controller. The second control signal bus (not shown) of the memory module is connected to the first control signal bus (not shown) of the memory controller.

It should be noted that, in order to simplify the figure, the third data bus inversion control line, the second control circuit, and the second control signal bus included in the memory buffer and the fourth data bus inversion control line, the first control circuit and the first control signal bus included in the memory controller are all not shown in FIG. 6.

It should be noted that, those skilled in the art should understand that, the memory module is merely exemplary and is not intended to limit the present invention. In fact, the number and types of the memory chips included in the memory module are not limited to those shown in the figure.

The foregoing embodiments merely exemplarily describe the principle and efficacy of the present invention and are not intended to limit the present invention. Any person skilled in the art can modify the embodiments without departing from the script and scope of the present invention. Therefore, the protection scope of the present invention is subject to the protection scope of the appended claims.

What is claimed is:
1. A data output circuit, comprising:
   a check data generation unit, configured to generate a first set of check data according to $n1*b$ pieces of data in $n*b$ pieces of data to be output, and generate a second set of check data according to the remaining $n2*b$ pieces of data in the $n*b$ pieces of data to be output, where n, n1, n2 and b are integer values corresponding to a number of pieces of data, $n*b$ is a numerical multiplication of the n pieces of data and number of the b pieces of data, $n1*b$ is a numerical multiplication of the n1 pieces of data and the b pieces of data, and, $n2*b$ is a numerical multiplication of the n2 pieces of data and the b pieces of data;
   a first data processing unit, connected to an output end of the check data generation unit, and configured to:
   (1) determine first inversion control data corresponding to n pieces of data according to every n pieces of data in the $n*b$ pieces of data to be output;
   (2) determine first inversion control data corresponding to every n pieces of data in data formed by the first set of check data and the second set of check data from the check data generation unit to be of a second numerical value;
   (3) when the determined first inversion control data is of a first numerical value, negate n pieces of data to be output corresponding to the first inversion control data and then output the n pieces of negated data; otherwise, directly output the n pieces of data to be output; and
(4) output the first inversion control data corresponding to every n pieces of data; and
a first data output unit, connected to an output end of the first data processing unit, disposed with a first data bus and a first data bus inversion control line, and configured to output the n*b pieces of data, the first set of check data, the second set of check data, and the first inversion control data from the first data processing unit, wherein every time the n pieces of data are output through the first data bus, the first inversion control data corresponding to the n pieces of data is output through the first data bus inversion control line.

2. The data output circuit as in claim 1, wherein the check data generation unit comprises two sets of cyclic redundancy check data generation circuits.

3. The data output circuit as in claim 1, wherein the first data output unit comprises a first data output sub-unit, connected to the output end of the first data processing unit, disposed with a first data bus and a first data bus inversion control line, configured to output a generated write data collection signal through the first data bus, and further configured to, whenever outputting the n pieces of data from the first data processing unit through the first data bus, output the first inversion control data corresponding to the n pieces of data through the first data bus inversion control line, and after outputting the n pieces of data from the first data processing unit at a $b^{th}$ time, output the first set of check data and the second set of check data, the $b^{th}$ time being a number equal to the number of b pieces of data.

4. A data receiving circuit, comprising:
a second data collection unit, disposed with a sixth data bus and a fourth data bus inversion control line, and configured to collect n pieces of data through the sixth data bus each time to accumulatively collect n*b pieces of data, a third set of check data, and a fourth set of check data, and collect fourth inversion control data corresponding to every n pieces of data through the fourth data bus inversion control line;
a second data restoration unit, connected to an output end of the second data collection unit, and configured to, when the fourth inversion control data is of the first numerical value, negate n pieces of data corresponding to the fourth inversion control data and output the n pieces of negated data; otherwise, directly output the n pieces of data; and
a check unit, connected to an output end of the second data restoration unit, and configured to check whether n1*b pieces of data in the n*b pieces of data from the second data restoration unit is faulty according to the third set of check data from the second data restoration unit, and check whether n2*b pieces of data in the n*b pieces of data from the second data restoration unit is faulty according to the fourth set of check data from the second data restoration unit, so as to check whether the n*b pieces of data from the second data restoration unit is faulty, where n, n1, n2 and b are integer values corresponding to a number of pieces of data, n*b is a numerical multiplication of the n pieces of data and number of the b pieces of data, n1*b is a numerical multiplication of the n1 pieces of data and the b pieces of data, and, n2*b is a numerical multiplication of the n2 pieces of data and the b pieces of data.

5. A write circuit for writing data into a memory chip, comprising:

a first data collection unit, disposed with a second data bus and a second data bus inversion control line, and configured to collect n pieces of data through the second data bus each time to accumulatively collect n*b pieces of data, a first set of check data, and a second set of check data, and collect second inversion control data corresponding to every n pieces of data through the second data bus inversion control line;
a first data restoration unit, connected to an output end of the data collection unit, and configured to, when the second inversion control data from the data collection unit is of a first numerical value, negate n pieces of data corresponding to the inversion control data and output the n pieces of negated data; otherwise, directly output the n pieces of data; and
a write unit, connected to an output end of the data restoration unit, and configured to write n1*b pieces of data in the n*b pieces of data and the first set of check data from the data restoration unit into one memory chip through a third data bus, and write n2*b pieces of data in the n*b pieces of data and the second set of check data from the data restoration unit into the other memory chip through the third data bus, wherein
where n, n1, n2 and b are integer values corresponding to a number of pieces of data, n*b is a numerical multiplication of the n pieces of data and number of the b pieces of data, n1*b is a numerical multiplication of the n1 pieces of data and the b pieces of data, and, n2*b is a numerical multiplication of the n2 pieces of data and the b pieces of data.

6. The write circuit as in claim 5, wherein the first data collection unit comprises a timing correction circuit, configured to correct timing according to a write data collection signal from the second data bus, so as to correctly collect data from the second data bus and the second inversion control data from the second data bus inversion control line.

7. The write circuit as in claim 5, wherein the first data collection unit comprises a first collection sub-unit, disposed with the second data bus and the second data bus inversion control line, and configured to collect n pieces of data through the second data bus each time, and meanwhile, collect second inversion control data corresponding to the n pieces of data through the second data bus inversion control line, and regard data collected after a $b^{th}$ time of collection as the first set of check data and the second set of check data, the $b^{th}$ time being a number equal to the number of b pieces of data.

8. A read circuit for reading data from a memory chip, comprising:
a data read unit, disposed with a fourth data bus connected to two memory chips, and configured to read n1*b pieces of data and a third set of check data from one memory chip and read n2*b pieces of data and a fourth set of check data from the other memory chip through the fourth data bus;
a second data processing unit, connected to an output end of the data read unit, and configured to:
(1) determine third inversion control data corresponding to every n pieces of data in n*b pieces of data from the data read unit;
(2) determine third inversion control data corresponding to every n pieces of data in data formed by the third set of check data and the fourth set of check data to be of a second numerical value;
(3) when the determined third inversion control data is of a first numerical value, negate n pieces of data corresponding to the third inversion control data and then output the n pieces of negated data; otherwise, directly output the n pieces of data; and (4) output the third inversion control data corresponding to the every n pieces of data, wherein n=n1+n2; and a second data output unit, connected to an output end of the second data processing unit, and configured to output n pieces of data from the second data processing unit through a fifth data bus each time to accumulatively output the n*b pieces of data, the third set of check data, and the fourth set of check data, wherein each time the n pieces of data are output, third inversion control data corresponding to the n pieces of data is output through the third data bus inversion control line, where n, n1, n2 and b are integer values corresponding to a number of pieces of data, n*b is a numerical multiplication of the n pieces of data and number of the b pieces of data, n1*b is a numerical multiplication of the n1 pieces of data and the b pieces of data, and, n2*b is a numerical multiplication of the n2 pieces of data and the b pieces of data, and n1+n2 is a numerical addition of the n1 pieces of data and the n2 pieces of data.

9. The read circuit as in claim 8, wherein the data read unit comprises a timing correction circuit, configured to correct timing according to a read data collection signal from the fourth data bus, so as to accurately read data through the fourth data bus.

10. The read circuit as in claim 8, wherein the data read unit comprises a read sub-unit, configured to read n1 pieces of data from one memory chip and read n2 pieces of data from the other memory chip through the fourth data bus each time and then output the n1 pieces of data and the n2 pieces of data, and after a $b^{th}$ time of read, read the third set of check data from one memory chip and read the fourth set of check data from the other memory chip, the $b^{th}$ time being a number equal to the number of b pieces of data.

11. A memory buffer, comprising a second control circuit disposed with a second control signal bus, and comprising:
a write circuit and the read circuit as in claim 8, the write circuit comprising:
a first data collection unit, disposed with a second data bus and a second data bus inversion control line, and configured to collect n pieces of data through the second data bus each time to accumulatively collect n*b pieces of data, a first set of check data, and a second set of check data, and collect second inversion control data corresponding to every n pieces of data through the second data bus inversion control line;
a first data restoration unit, connected to an output end of the data collection unit, and configured to, when the second inversion control data from the data collection unit is of a first numerical value, negate n pieces of data corresponding to the inversion control data and output the n pieces of negated data; otherwise, directly output the n pieces of data; and
a write unit, connected to an output end of the data restoration unit, and configured to write n1*b pieces of data in the n*b pieces of data and the first set of check data from the data restoration unit into one memory chip through a third data bus, and write n2*b pieces of data in the n*b pieces of data and the second set of check data from the data restoration unit into the other memory chip through the third data bus, wherein the second data bus comprised in the write circuit is connected to the fifth data bus comprised in the read circuit, the third data bus comprised in the write circuit is connected to the fourth data bus comprised in the read circuit, the second data bus inversion control line comprised in the write circuit is connected to the third data bus inversion control line comprised in the read circuit, and the second control circuit controls read and write operations of the write circuit and the read circuit according to a received control signal, where n, n1, n2 and b are integer values corresponding to a number of pieces of data, n*b is a numerical multiplication of the n pieces of data and number of the b pieces of data, n1*b is a numerical multiplication of the n1 pieces of data and the b pieces of data, and, n2*b is a numerical multiplication of the n2 pieces of data and the b pieces of data.

12. A memory module, comprising the memory buffer as in claim 11 and at least two memory chips, wherein the third data bus comprised in the memory buffer is connected to each of the memory chips.

13. The memory module as in claim 12, wherein the memory chip comprises DDR4 X4 memory chip.

14. A memory controller, comprising a first control circuit disposed with a first control signal bus and configured to output a control signal comprising a read/write control instruction, and further comprising:
a data output circuit and the data receiving circuit as in claim 10, the data output circuit comprising:
a check data generation unit, configured to generate a first set of check data according to n1*b pieces of data in n*b pieces of data to be output, and generate a second set of check data according to the remaining n2*b pieces of data in the n*b pieces of data to be output, where n, n1, n2 and b are integer values corresponding to a number of pieces of data, n*b is a numerical multiplication of the n pieces of data and number of the b pieces of data, n1*b is a numerical multiplication of the n1 pieces of data and the b pieces of data, and, n2*b is a numerical multiplication of the n2 pieces of data and the b pieces of data;
a first data processing unit, connected to an output end of the check data generation unit, and configured to:
(1) determine first inversion control data corresponding to n pieces of data according to every n pieces of data in the n*b pieces of data to be output;
(2) determine first inversion control data corresponding to every n pieces of data in data formed by the first set of check data and the second set of check data from the check data generation unit to be of a second numerical value;
(3) when the determined first inversion control data is of a first numerical value, negate n pieces of data to be output corresponding to the first inversion control data and then output the n pieces of negated data; otherwise, directly output the n pieces of data to be output; and
(4) output the first inversion control data corresponding to every n pieces of data; and
a first data output unit, connected to an output end of the first data processing unit, disposed with a first data bus and a first data bus inversion control line, and configured to output the n*b pieces of data, the first set of check data, the second set of check data, and the first inversion control data from the first data processing unit, wherein every time the n pieces of data are output through the first data bus, the first inversion control data corresponding to the n pieces of data is output through the first data bus inversion control line, wherein the first data bus of the data output circuit is connected to the sixth data bus of the data receiving circuit, and the first data bus inversion control line of the data output circuit is connected to the fourth data bus inversion control line of the data receiving circuit.

15. The data receiving circuit as in claim 4, wherein the second data collection unit comprises a timing correction circuit, configured to correct timing according to a read data collection signal from the sixth data bus, so as to accurately collect data through the sixth data bus.

16. The data receiving circuit as in claim 4, wherein the second data collection unit comprises a second collection sub-unit, disposed with the sixth data bus and the fourth data bus inversion line, and configured to collect n pieces of data through the sixth data bus each time, and meanwhile, collect second inversion control data corresponding to the n pieces of data through the second data bus inversion control line, and use data collected through the sixth data bus after a $b^{th}$ time of collection as the third set of check data and the fourth set of check data, the $b^{th}$ time being a number equal to the number of b pieces of data.

17. The data receiving circuit as in claim 4, wherein the check unit comprises:
 a circuit for generating check data to be compared, connected to the output end of the second data restoration unit, and configured to generate a first set of check data to be compared according to the n1*b pieces of data in the n*b pieces of data from the second data restoration unit, and generate a second set of check data to be compared according to the remaining n2*b pieces of data in the n*b pieces of data from the second data restoration unit; and
 a check data comparison circuit, connected to an output end of the circuit for generating check data to be compared, and configured to compare the first set of check data to be compared with the third set of check data from the data restoration unit, and compare the second set of check data to be compared with the fourth set of check data from the data restoration unit, so as to output a check result for indicating whether the n*b pieces of data from the data restoration unit is correct.

18. The data receiving circuit as in claim 17, wherein the circuit for generating check data to be compared comprises a cyclic redundancy check data generation circuit.

\* \* \* \* \*